United States Patent [19]
Yamamoto et al.

[11] Patent Number: 5,870,222
[45] Date of Patent: Feb. 9, 1999

[54] MOVABLE OBJECTIVE LENS TYPE OPTICAL MICROSCOPE HAVING STATIONARY STAGE AND SPECIMEN MOVING STAGE

[75] Inventors: Soji Yamamoto, Tami; Itaru Endo, Hachioji; Yasushi Kaneko, Hino, all of Japan

[73] Assignee: Olympus Optical Co., Ltd., Tokyo, Japan

[21] Appl. No.: 543,274

[22] Filed: Oct. 16, 1995

[30] Foreign Application Priority Data

Oct. 17, 1994 [JP] Japan .................................. 6-250789

[51] Int. Cl.⁶ .......................... G02B 21/00; G02B 21/26; G02B 21/34; G01N 21/01
[52] U.S. Cl. .......................... 359/368; 359/391; 359/392; 359/393; 359/394; 359/396; 359/398
[58] Field of Search .................... 359/368, 391, 359/392, 393, 396, 398, 394

[56] References Cited

U.S. PATENT DOCUMENTS

| | | | |
|---|---|---|---|
| 4,573,772 | 3/1986 | Endo et al. | 359/370 |
| 4,749,270 | 6/1988 | Endo et al. | 359/392 |
| 4,766,465 | 8/1988 | Takahashi | 359/393 |
| 5,256,876 | 10/1993 | Hazaki et al. | 250/306 |
| 5,287,272 | 2/1994 | Rutenburg et al. | 364/413.01 |
| 5,364,790 | 11/1994 | Atwood et al. | 359/398 |
| 5,450,233 | 9/1995 | Yamamoto et al. | 359/368 |

FOREIGN PATENT DOCUMENTS

| | | |
|---|---|---|
| 6-4723 | 1/1994 | Japan . |
| 6-60818 | 8/1994 | Japan . |

Primary Examiner—Thong Nguyen
Assistant Examiner—Mohammad Y. Sikder
Attorney, Agent, or Firm—Frishauf, Holtz, Goodman, Langer & Chick

[57] ABSTRACT

An erect movable objective lens type optical microscope includes a frame, an observation optical portion having an objective lens, a stage portion, a moving mechanism, and a vibration synchronizing mechanism. The observation optical portion is movably provided on the frame, and the stage portion is fixedly provided on the frame. The stage portion includes a specimen moving stage, and a stationary stage adapted to receive a manipulator for manipulating a specimen provided on the specimen moving stage. The moving mechanism is provided on the frame for moving the observation optical portion and the stage portion relative to each other, and the vibration synchronizing mechanism is provided for synchronizing a vibration system of the stationary stage and a vibration system of the specimen moving stage.

20 Claims, 10 Drawing Sheets

MOVABLE OBJECTIVE LENS TYPE OPTICAL MICROSCOPE HAVING STATIONARY STAGE AND SPECIMEN MOVING STAGE

BACKGROUND OF THE INVENTION

1. Field of the Invention

The present invention relates to a movable objective lens type optical microscope having a stationary stage and a specimen moving stage and, more particularly, to a movable objective lens type optical microscope which can suitably perform cell manipulation (patch clamp).

2. Description of the Related Art

Cell manipulation (patch clamp) is performed in the field of biology. Patch clamp is executed in electrophysiological experiments of a living cell or tissue or a cultured cell as well as in cell fusion. A movable objective lens type optical microscope having a manipulator, a stationary stage, and a specimen moving stage can be used for performing patch clamp.

FIG. 1 shows a conventional example of an optical microscope of this type. This optical microscope is a vertically movable objective lens type optical microscope on which a manipulator can be mounted and used, as disclosed in Jpn. UM Appln. KOKAI Publication No. 6-4723 (which shows an erect optical microscope). Referring to FIG. 1, the optical microscope has an arm 13 holding a lens barrel, and a base 22, that constitute a frame. The arm 13 is supported on the base 22 such that it can be vertically moved by a linear guide 13A provided between the arm 13 and the base 22.

Focusing knobs 17 for vertically moving the arm 13 are mounted to the arm 13. A stage rest 20 and a lamphouse 23 accommodating a light source are mounted to the base 22. A lens barrel 16 is fixed to the arm 13, and an eyepiece is mounted to its upper distal end. A revolver 15 is rotatably held by the arm 13. A plurality of objective lenses 14 having different magnifications are mounted to the revolver 15 so that an objective lens having a desired magnification can be selectively used.

The plurality of objective lenses 14 having different magnifications are fixed to the revolver 15 by screwing. In accordance with the switching operation of the revolver 15, one of the plurality of objective lenses 14 is set on an optical axis 13B, thereby changing the magnification. The objective lens 14 which is selected upon switching the revolver 15 is paired with the eyepiece, thus constituting the observation optical system of the microscope.

The stage rest 20 is provided upright on the base 22. A cross-moving stage 18 that can be moved in the X and Y directions is a stage for placing a specimen thereon. An end portion of the cross-moving stage 18 is supported by the stage rest 20 so that it is arranged at a position to cross the optical path of the observation optical system on the objective lens 14 side. A window for assuring the optical path is formed at the central portion of the cross-moving stage 18. A condenser rest 21 supports a condenser lens 19 which guides illumination light to the specimen, and is movable vertically. A stationary stage 11 arranged above the cross-moving stage 18 has a window for assuring the optical path at its central portion. The stationary stage 11 is fixed on the base 22 and its front and rear end sides are supported by support plates 24 and 25. A manipulator 12 is used for patch clamp in biological experiments. The manipulator 12 (not shown) can be fixed on the stationary stage 11 with magnets, screws, or the like (not shown).

To perform observation by using such a conventional optical microscope, the power switch of the lamphouse 23 is turned on to light the light source in the lamphouse 23. A specimen is placed on the cross-moving stage 18 in advance. The focusing knobs 17 are rotated to move the objective lenses 14 downward, thus performing focusing. The condenser lens 19 is adjusted at an optimum position by vertically moving the condenser rest 21 through operation of the position adjusting knob.

When a cell to be manipulated is found by observation, the manipulator 12 is set on the stationary stage 11. As the objective lens 14 interferes with this setting operation, it is moved upward. In patch clamp, the cell is fixed by suction or the like (this will be referred to as clamp hereinafter). Electrodes for performing the clamp are integrally formed on the distal end portion of the manipulator 12. These electrodes are set close to the cell.

Thereafter, the objective lens 14 is moved downward again to perform focusing. The electrodes of the manipulator 12 are moved to clamp the cell while observing the cell.

In general, the number of cells to be clamped is about 2 to 4. After one cell is clamped, another manipulator 12 is set on the stationary stage 11 to clamp another cell, and the operation described above is repeated in order to clamp the second cell with the newly set manipulator 12. In this manner, the manipulators 12 corresponding in number to the cells to be clamped are set, and the operation described above is repeated. Then, the experiment is started.

In the conventional microscope described above, when performing an electrophysiological experiment, the manipulator 12 is set on the microscope in order to clamp a cell as a specimen, and thereafter the cell is clamped by operating the manipulator 12. When another cell is to be clamped, a series of operations is repeated in which the objective lens 14 is retreated upward, another manipulator 12 is set and its electrodes are inserted in approximate portions of the cell, and thereafter the objective lens 14 is moved downward.

In this series of operations, a clamped cell may often be easily let loose due to a slight vibration occurring in the operation of setting another manipulator 12. The cell is typically as small as about 5 $\mu$m at a minimum, and the support structure for the stationary stage 11 on which the manipulator 12 is set and that for the cross-moving stage 18 for holding the specimen are different and have different vibration systems. Thus, vibrations may occur in the stationary stage 11 and in the cross-moving stage 18 independently of each other.

More specifically, although the conventional cross-moving stage 18 and the stationary stage 11 are both fixed to the base 22 of the microscope, they have arms of different lengths and different support systems, thus having different vibration systems upon application of an external vibration. As a result, the cross-moving stage 18 and the stationary stage 11 do not move in synchronism with each other. When the amplitudes of the vibrations increase, the stationary stage 11 and the cross-moving stage 18 move differently, so that the clamped small cell is undesirably released.

When the conventional optical microscope is examined in the light of the above fact, if the support portions (mounting portions to the base 22) of the stationary stage 11 and the cross-moving stage 18 are narrower than the width between the positions where the focusing knobs 17 are provided, the right-to-left span is excessively short compared to the size of the stationary stage 11, and the stationary stage 11 is thus unstable. In other words, in a microscope, the focusing knobs 17 are respectively mounted to the two sides of the microscope so that they can be operated with both or either one of the two hands. These right and left focusing knobs 17 are mounted to the arm 13 that holds the lens barrel and are comparatively close to the support portions of the stationary stage 11 and the cross-moving stage 18. Hence, to obtain a good operability, the mounting positions of the support portions of the stationary stage 11 and the cross-moving stage 18 must be set such that their widths are smaller than the width between the positions where the right and left focusing knobs 17 are arranged.

The stationary stage 11 and the cross-moving stage 18 have large widths. Accordingly, if the support widths of the stationary stage 11 and the cross-moving stage 18 are small, the stationary stage 11 and the cross-moving stage 18 can easily cause free vibration.

Thus, the stationary stage 11 and the cross-moving stage 18 are accordingly easily influenced by a vibration. In this manner, this support structure is employed in order to avoid interference by the hand when operating the focusing knobs 17. Thus, no problem occurs when operating the focusing knobs 17, as nothing interferes with the hand. However, upon application of an external vibration, the stationary stage 11 and the cross-moving stage 18 cause different vibrations, so that the clamped cell can be easily released.

Assume a case wherein a support structure is employed in which the support portions of the stationary stage 11 and the cross-moving stage 18 are wider than the width between the right and left focusing knobs 17 in order to provide anti-vibration properties against an external vibration. In this case, however, although the anti-vibration properties can be achieved, the operator's hand can easily interfere with the support systems of the stationary stage 11 and the cross-moving stage 18 while operating the focusing knobs 17. Then, the clamped object is released due to the vibration caused by the interference.

The conventional stationary stage 11 has a good stability as it has a sufficient span. However, since the stationary stage 11 and the cross-moving stage 18 have different vibration systems, as described above, when the amplitude of a vibration is large, the clamped object is released.

In summary, in the conventional arrangement, a vibration can be caused easily, and when a vibration occurs, the stationary stage 11 and the cross-moving stage 18 vibrate differently, so that the clamped object can be released easily.

Therefore, the conventional microscope must be handled very carefully and must be operated very prudently. Even then, the clamped object tends to be released, leading to a microscope which is inconvenient to use. Therefore, development of a microscope is demanded in which, during operation of the focusing knobs, the operator's hand will not easily interfere with other constituent elements of the microscope, and the manipulator on the stationary stage will not easily release the clamped object upon application of a vibration.

OBJECTS OF THE INVENTION

It is an object of the present invention to provide a movable objective lens type optical microscope in which vibration of a stage portion is suppressed as much as possible.

It is another object of the present invention to provide a movable objective lens type optical microscope in which, during operation of the focusing knobs, the operator's hand will not easily interfere with other constituent elements of the microscope, and whereby even if a vibration is applied, the influence of the vibration can be suppressed from acting on the manipulator, so that the object clamped by the manipulator will not be easily released.

SUMMARY OF THE INVENTION

The above objects are achieved by a movable objective lens type optical microscope having a stationary stage and a specimen moving stage, comprising:

a frame;

an observation optical portion having an objective lens and movably provided to the frame;

a stage portion having the stationary stage and the specimen moving stage that are fixedly provided to the frame; and a moving mechanism having focusing knobs, the moving mechanism moving the observation optical portion and the stage portion relative to each other and being provided to the frame.

The above objects are achieved by a movable objective lens type optical microscope having a stationary stage and a specimen moving stage, comprising:

a frame;

an observation optical portion having an objective lens and movably provided to the frame;

a stage portion having the stationary stage and the specimen moving stage that are provided to the frame;

a moving mechanism having focusing knobs, the moving mechanism moving the observation optical portion and the stage portion relative to each other and being provided to the frame; and a vibration synchronizing mechanism for synchronizing a vibration system of the stationary stage and a vibration system of the specimen moving stage.

The above objects are achieved by a movable objective lens type optical microscope having a stationary stage and a specimen moving stage, comprising:

a frame having a base and an arm provided upright on the base;

an observation optical portion having an objective lens and movably provided to the arm of the frame;

the stationary stage;

a manipulator provided to the stationary stage;

the specimen moving stage provided to the stationary stage;

a fixing member for fixing, of the stationary stage and the specimen moving stage, at least the stationary stage to the arm of the frame; and a moving mechanism having focusing knobs provided to a lower portion of the frame, the moving mechanism moving the observation optical portion and the stage portion relative to each other and being incorporated in the frame.

According to the movable objective lens type optical microscope having the stationary stage and the specimen moving stage described above, since the stationary stage and the specimen moving stage constitute an integral structure which is fixed to the frame of the microscope, the stationary stage and the specimen moving stage have a common vibration system. Even if a vibration is applied, the vibration of the stationary stage and that of the specimen moving stage are synchronized. In this case, when a manipulator is mounted on the stationary stage, the cell of the specimen and the electrodes of the manipulator vibrate in the same manner. Since the cell and the electrodes of the manipulator vibrate in synchronism with each other upon application of an external vibration in this manner, a clamped object will not be undesirably released.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The various types of preferred embodiments of the present invention follow the principles set forth hereinbelow. More specifically, in the present invention, a stationary stage for mounting a manipulator thereon and a movable stage for placing a specimen thereon are connected close to each other. Thus, the stationary stage and the movable stage have a common vibration system. Even if an external vibration occurs, the vibrations of the two stages are synchronized with each other. Thus, the clamped object on the movable stage will not be easily released. The positions of the support systems and the distance between them are considered so that the support systems of the stationary stage and the moving stage will not interfere with the operator's hand when operating the operating knobs (focusing knobs) that move the objective lens vertically.

In the conventional optical microscope, the support system of the stationary stage and that of the cross-moving stage serving as the moving stage are close to each other. Thus, when operating the focusing knobs, the operator's hand can easily interfere with these support systems. In order to avoid this, conventionally, the support systems of the stationary and cross-moving stages cannot but employ a structure having low anti-vibration properties whose support range is greatly narrower than the widths of these stages. In contrast to this, in the structure of the present invention, this problem is solved, and an easy-to-handle optical microscope can be provided in which high anti-vibration properties can be maintained while achieving high operability of the focusing knobs, so that the object clamped by the manipulator is not easily released.

The preferred embodiments of the present invention that follow the principles described above will be described with reference to the accompanying drawings.

(First Embodiment)

Figure 1:
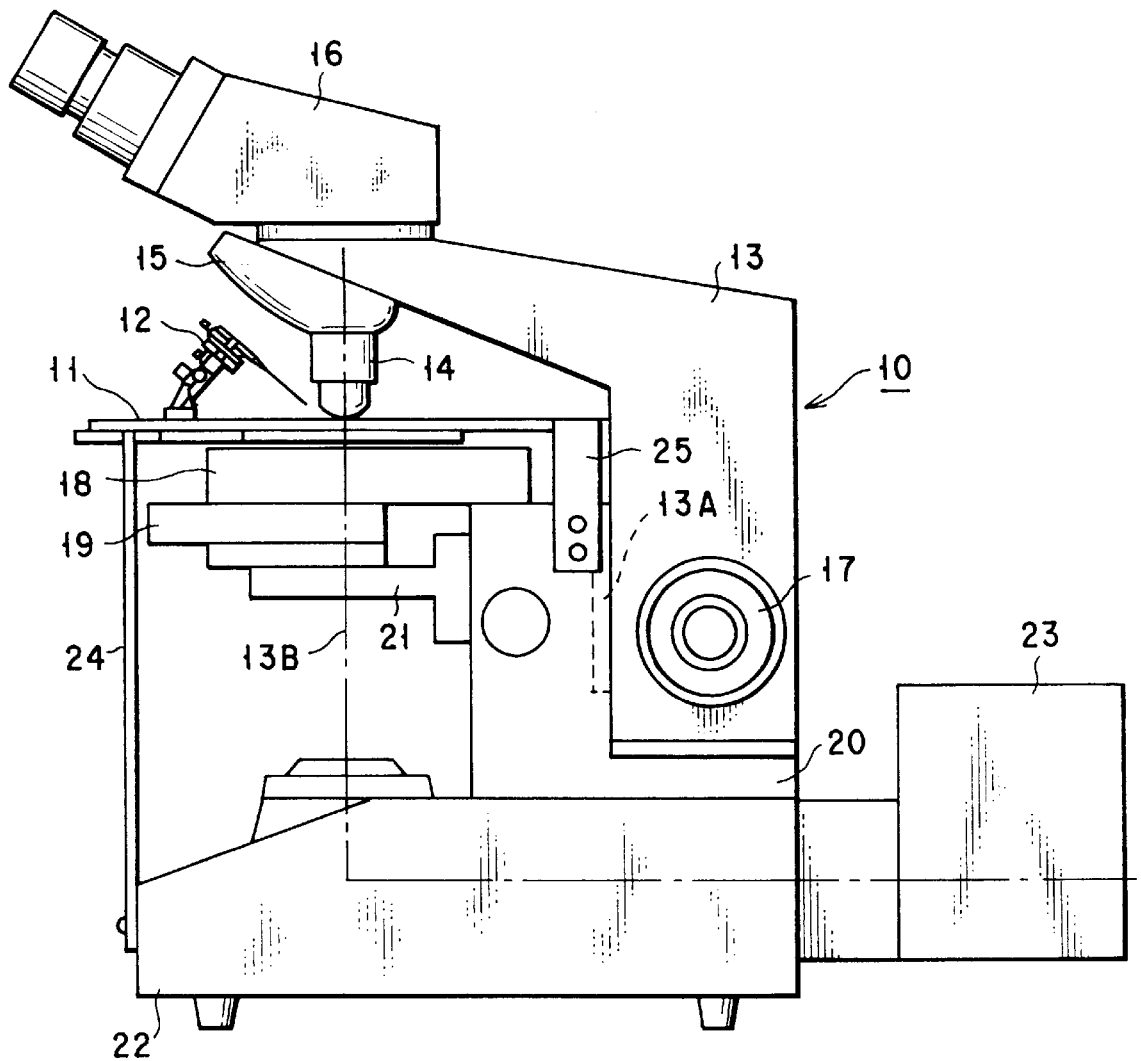
FIG. 1 is a side view of a conventional erect optical microscope.
Figures 2A, 2B:
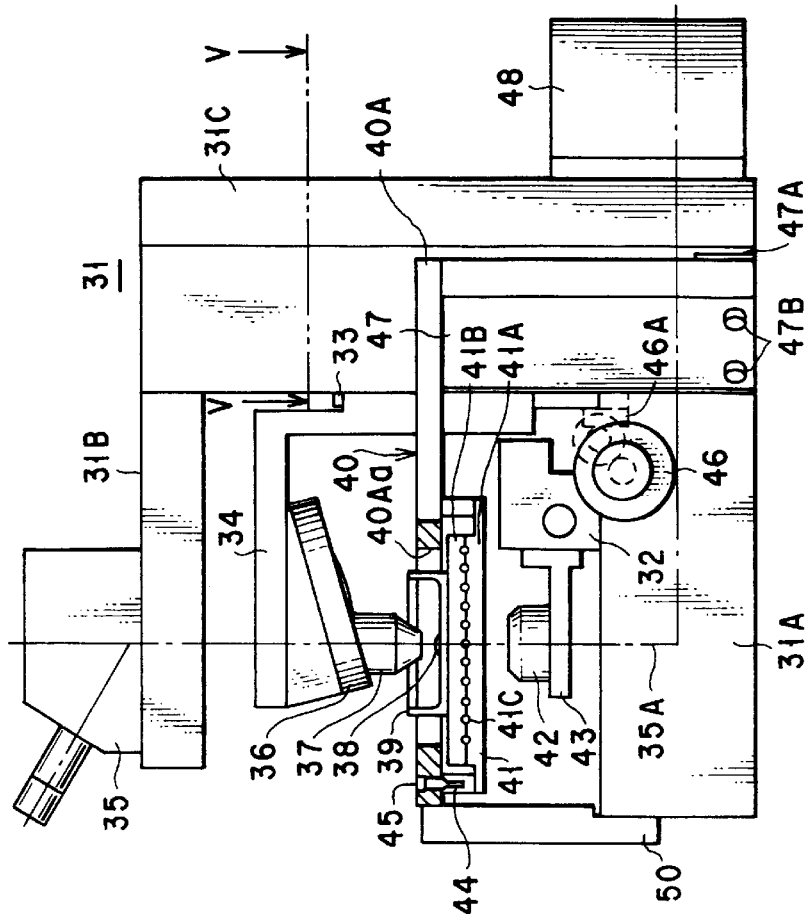
FIGS. 2A and 2B are side and front views, respectively, of an erect optical microscope according to the first embodiment of the present invention.
Figure 3:
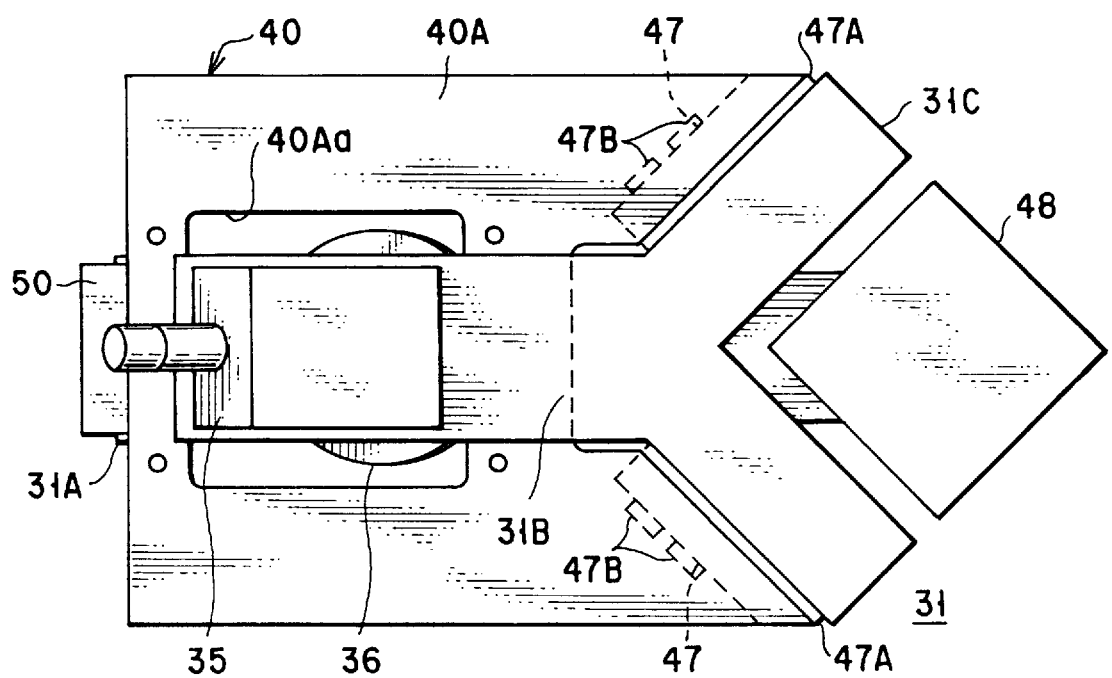
FIG. 3 is a plan view of the erect optical microscope according to the first embodiment.

Referring to FIGS. 2A, 2B, and 3, a frame 31 is an integral structure having a U-letter shape when seen from a side surface, in which a pair of rigid members 31A and 31B having a Y-letter shape when seen from above are vertically opposed to each other and one end portion side of each of the rigid members 31A and 31B is supported by a support pillar portion 31C having a V-shaped section.

A condenser rest 32 is arranged on the lower member 31A of the frame 31. The condenser rest 32 is fixed to the frame 31. A condenser vertically moving portion 43 is mounted to the condenser rest 32 and fixes and holds a condenser lens 42 on its upper side. The position of the condenser vertically moving portion 43 can be vertically adjusted with respect to the condenser rest 32.

The condenser lens 42 is a lens which forms illumination light to be irradiated to a specimen and having a uniform light distribution for the purpose of microscopic observation.

A lens barrel 35 is fixed on the upper member 31B of the frame 31. An eyepiece is mounted to the upper end of the lens barrel 35. A guide 33 is vertically provided to the support pillar portion 31C to be movable vertically. One end side of a revolver vertically moving plate 34 is fixed to the guide 33, so that the revolver vertically moving plate 34 can be vertically moved on the support pillar portion 31C by the guide 33. A revolver 36 has a plurality of objective lenses 37 having different magnifications, and is rotatably mounted to the lower portion of the revolver vertically moving plate 34 close to the other end side of the revolver vertically moving plate 34.

An optical axis 35A in the lower portion of the lens barrel 35 is directed to the condenser lens 42 by an optical system. When the revolver 36 is rotated on the optical axis 35A connecting the lens barrel 35 and the condenser lens 42, a desired one of the objective lenses 37 of the revolver 36 can be located on the optical axis 35A such that its optical axis coincides with the optical axis 35A. When a desired objective lens 37 is selected and switched by rotating the revolver 36 in this manner, the magnification of the microscope can be changed.

Focusing knobs 46 are provided to the lower member 31A of the frame 31. When the focusing knobs 46 are rotated, the guide 33 can be vertically moved along the support pillar portion 31C through a movable drive mechanism 46A comprising a gear, a rack, and the like.

Figure 5:
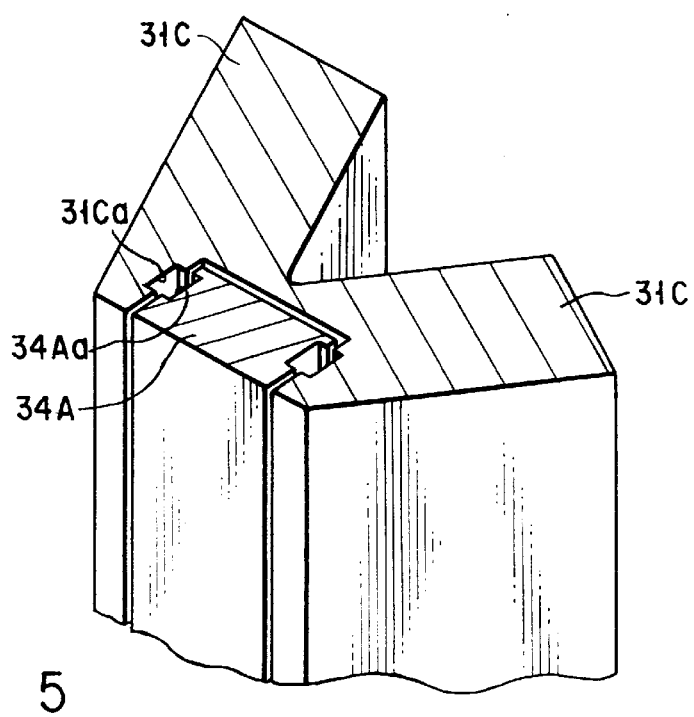
FIG. 5 is a perspective sectional view taken along line V—V in FIG. 2A, of part of the arm portion of the erect optical microscope according to the first embodiment.

As shown in FIG. 5, guide grooves 31Ca are formed in the support pillar portion 31C of the frame 31, and guide grooves 34Aa are similarly formed in a base body 34A of the revolver vertically moving plate 34. Guide members (not shown), e.g., bearings, are arranged in rectangular parallelepiped grooves defined by the guide grooves 31Ca and the guide grooves 34Aa. This structure enables the revolver vertically moving plate 34 to move vertically with respect to the support pillar portion 31C of the frame 31.

In this microscope, the focusing knobs 46, which are manually operated for retreating the objective lens 37 and for performing re-focusing every time a manipulator is added and every time patch clamp is performed, are provided to the lower member 31A of the frame 31. Hence, the distance between the stationary stage 40 and the focusing knobs 46 can be maintained as large as possible so that a stationary stage 40 on which the manipulator is set and the hands that operate the focusing knobs 46 will not interfere with each other.

Figure 4:
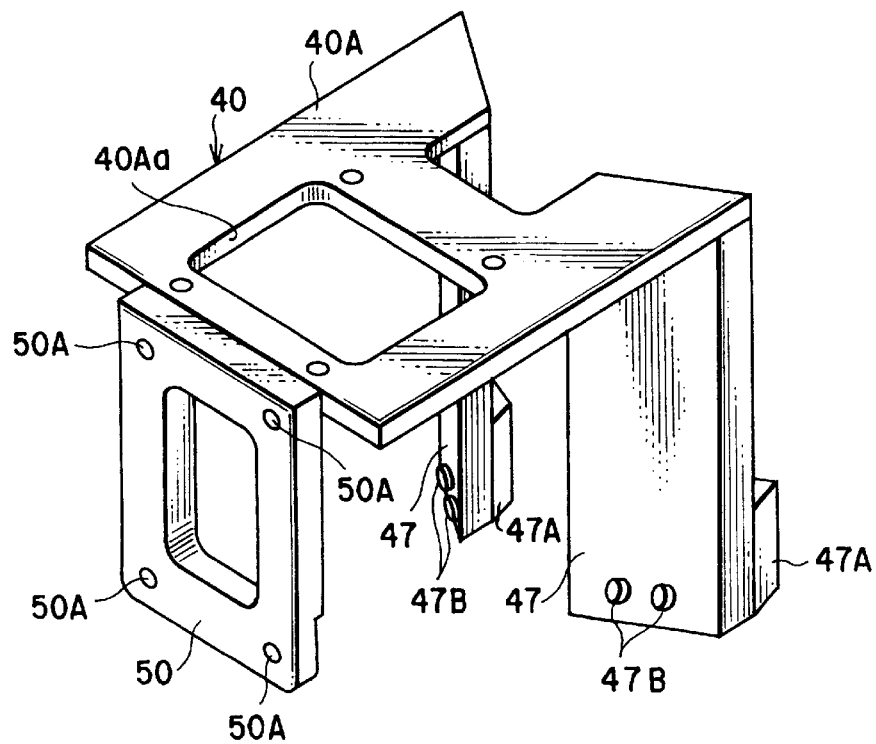
FIG. 4 is a perspective view of the stationary stage of the erect optical microscope according to the first embodiment.

As shown in FIG. 4, in the stationary stage 40 using a rigid member, two support members 47 are provided to one end side of a stage plate 40A formed with a hole, and a support member 50 provided to the other end side of the stage plate 40, each at right angles. More specifically, one end side of the support member 50 is fixed to one end side of the stage plate 40A, and the other end side of the support member 50 is fixed to the front surface of the lower member 31A of the frame 31 with machine screws 50A.

One end side of each of the two support members 47 is fixed to the other end side of the stage plate 40A. A stationary base 47A is formed on the other end side of each of the two support members 47. The stationary bases 47A are fixed to the front surface of the lower member 31A of the frame 31 with machine screws 47B.

In this manner, the stationary stage 40 employs the structure of a beam which is supported at its two ends by the front surface of the lower member 31A and the side surface of the support pillar portion 31C, respectively, of the frame 31. Thus, this support structure suppresses free vibration.

The support members 50 and 47 are members each made of a material having a high strength. The frame 31 has a Y-letter shape and fixes the support members 47 of the stationary stage 40 by utilizing the wall surface of its V-shaped support pillar portion 31C. The width of the V-shaped support pillar portion 31C corresponds to that of the stationary stage 40. Thus, the rear end side of the stationary stage 40 can be firmly held by the support pillar portion 31C over a wide range. Therefore, the stationary stage 40 achieves a support structure which is stable against vibration (less susceptible to the influence of vibration).

The front edge side of the stationary stage 40 is fixed to the frame 31 with the support member 50 having a high strength. Thus, although the fixing structure of this front edge side only partly supports the front edge side of the stationary stage 40, it firmly supports the rear end side of the stationary stage 40 over a wide range, so that the stationary stage 40 is less influenced by a vibration.

A window 40Aa is formed at the central portion of the stationary stage 40, and a cross-moving stage 41 is mounted below the window 40Aa. The cross-moving stage 41 is provided with a movement adjusting mechanism (not shown) for reduction adjustment. This movement adjusting mechanism has a knob (not shown). When the knob of the movement adjusting mechanism is operated, the cross-moving stage 41 is moved in the X- and Y-axis directions, thereby adjusting the position of a specimen case 39 on the cross-moving stage 41. The cross-moving stage 41 is a moving stage in which a guide member 41C is arranged between a main body 41A and a movable stage 41B such that the movable stage 41B is movable in the X and Y directions on the main body 41A. Although not shown, a window for assuring an optical path is formed at the central portion of the cross-moving stage 41. The window of the cross-moving stage 41 is provided so that illumination light emerging from the condenser lens 42 toward the objective lens 37 will not be shielded. The peripheral portion of the main body of the cross-moving stage 41 is fixed to the statio i nary stage 40 with a bolt 45 through a connecting member 44. Hence, a prescribed degree of freedom of the movement of the movable stage of the cross-moving stage 41 is ensured, and the structure of the cross-moving stage 41 as a vibration system seen from the whole cross-moving stage 41 becomes integral with the stationary stage 40.

The specimen case (petri dish) 39 is placed on the cross-moving stage 41. A cell 38 is placed in the specimen case 39. The interior of the specimen case 39 is filed with a solution. A lamphouse 48 is fixedly mounted to the rear surface side of the lower member 31A of the frame 31. The lamphouse 48 has a lamp in it. The lamp of the lamphouse 48 is lit upon turning on the power switch, thereby generating illumination light.

The illumination light generated upon lighting the lamp in the lamphouse 48 is incident on the condenser lens 42 through a light guide system provided in the frame 31. The illumination light condensed by the condenser lens 42 is transmitted through the cell 38 serving as the specimen and is incident on the objective lens 37. Then, after passing through the objective lens 37, the light is transmitted through the lens barrel 35 and reaches the eyepiece (not shown) at the distal end side of the lens barrel 35, so that it is observed as an image.

A manipulator 49 is mounted to the stage plate 40A of the stationary stage 40. The manipulator 49 has a structure which is conventionally used in patch clamp or the like in biological experiments, and its distal end has electrodes for attracting a cell by suction. The manipulator 49 can be mounted at a desired position on the stationary stage 40, and is constituted by a support stand 49A, a pillar 49B, a swing support portion 49C, and the like. The pillar 49B is mounted upright on the support stand 49A. The swing support portion 49C is movably supported on the pillar 49B. When a clamp screw is clamped at a desired position, the swing support portion 49C can be fixed such that the electrode side at the distal end of a manipulator body 49D of the swing support portion 49C is directed to a desired direction with a desired angle.

The operation of the microscope having the above arrangement will be described. To perform an actual microscopic observation with this microscope, the light of the lamp of the lamphouse 48 is lit by turning on the power switch, so that illumination light is generated, thereby illuminating the specimen (cell or the like) in the specimen case 39. In this state, the focusing knobs 46 are rotated to vertically move the revolver vertically moving plate 34. The revolver 36 held by the revolver vertically moving plate 34 is moved to vertically move the objective lens 37 provided to the revolver 36, thereby performing focusing. Then, the microscopic observation is performed.

At this time, the condenser lens 42 is vertically moved so as to be located at an optimum position. The knob of the movement adjusting mechanism provided to the cross-moving stage 41 is operated so that, of the specimen in the specimen case 39, a cell which is to be observed comes to an optimum position in the observation field of view. Thus, the cross-moving stage 41 is moved in the X- and Y-axis directions, thereby adjusting the position of the specimen case 39 on the cross-moving stage 41.

When the positioning of the cell to be clamped is completed by performing this adjustment while observing the specimen in the specimen case 39 with the objective lens 37, then, the focusing knobs 46 are operated to retreat the objective lens 37 upward, and the manipulator 49 is set on the stationary stage 40 in order to insert the electrodes to a portion near the target cell. A magnet mechanism for mounting/detaching the manipulator 49 is provided to the stage plate 40A. After the manipulator body 49D is position-adjusted, it can be firmly fixed to the pillar 49B with a screw or the like through the swing support portion 49C.

Accordingly, the manipulator body 49D is firmly fixed on the stationary stage 40 in a desired posture. In this state, the focusing knobs 46 are rotated to move the revolver vertically moving plate 34 downward, in order to move the objective lens 37 downward, thereby performing focusing again.

Upon this process, the observer observes the specimen (cell) in the specimen case 39 and the electrodes of the manipulator body 49D as images. In order to clamp the cell with the electrodes, the manipulator 49 is operated to move the electrodes toward the cell. When the electrodes contact the cell, suction is performed, thereby completing the clamp.

Regarding the magnification of the objective lens 37, cell selection is performed with a low magnification of about ×4 to ×10. In the clamp process, the magnification is changed to about ×20 to ×40 in accordance with the size of the cell (the diameter of 5 µm to 50 µm), and observation is performed.

Generally, in an electrophysiological experiment such as patch clamp, about 2 to 4 sets of manipulators are used in one experiment. Each manipulator is set for use by the operation as described above. Thus, after the first one is set, the same operation is repeated once when two manipulators are to be set, twice when three manipulators are to be set, and three times when four manipulators are to be set. In this manner, the same operation is repeated a number of times.

The procedure of setting the second manipulator for service will be described. When the second manipulator is to be set and its electrodes are to be inserted near the cell, the objective lens 37 interferes. To prevent this, the objective lens 37 is retreated upward by rotating the focusing knobs 46. At this time, as shown in FIGS. 3 and 2B, in the arrangement of this embodiment, when the focusing knobs 46 are to be manually operated, no obstacles exist, so that the respective members on the frame 31 and the operator's hand will not interfere with each other by contacting each other. Thus, no vibration will be generated in elements constituting the microscope.

As a sole exception, when the focusing knobs 46 are operated, some rotation moment occurs to apply vibration to the frame 31. Also, if an external vibration occurs near the microscope, the frame 31 is influenced by it. A microscope of this type is generally set on a table having a vibration-absorbing structure or an anti-vibration structure as a countermeasure against an external vibration. Accordingly, an external vibration to which the microscope may be exposed can be regarded as a small vibration when compared to interference or the like between an element constituting the microscope and the operator's hand.

Furthermore, in the arrangement of this embodiment, the stationary stage 40 and the cross-moving stage 41 are integral. Due to this integral structure, the stationary stage 40 and the cross-moving stage 41 vibrate in synchronism with each other, so that the manipulator on the stationary stage 40 that has clamped a cell maintains the cell clamping state.

In this manner, in the first embodiment, the focusing knobs 46, which are manually operated for retreating the objective lens 37 and for performing re-focusing every time a manipulator is added and every time patch clamp is performed, are provided to the lower member 31A of the frame 31. Hence, the distance between the stationary stage 40 and the focusing knobs 46 can be maintained as large as possible so that the stationary stage 40 on which the manipulator is set and the hands that operate the focusing knobs 46 will not interfere with each other.

Also, an integral structure is employed for the stationary and cross-moving stages in which the cross-moving stage 41 is incorporated in the stationary stage 40, and the structure of a beam supported at its two ends is employed in which the two ends of the stationary stage 40 are supported and fixed by the frame.

Therefore, when operating the focusing knobs, the stationary and cross-moving stages will not easily interfere with the operator's hands, so that a vibration will not be easily induced. Also, the stationary and cross-moving stages do not easily vibrate even upon application of a vibration. Even if a vibration is applied, the stationary and cross-moving stages vibrate in synchronism with each other. Accordingly, even if a vibration is applied, the cross-moving stage for placing a specimen thereon and the stationary stage for setting the manipulator thereon vibrate integrally, so that the object clamped by the manipulator will not be easily released.

Regarding the mounting structure of the stationary stage 40, in this embodiment, the stationary stage 40 is supported at three points including the front portion of the frame and two lower portions of the rear portion of the frame. However, the mounting structure is not limited to this, and it suffices as far as a support structure which will not easily cause vibration is employed. Accordingly, if the rigidity of the stationary stage 40 is increased, the stationary stage 40 may be supported at two central portions of its rear portion and at two upper portions of its rear portion. It is also easily arrived at to employ a hanging type support structure with which the stationary stage 40 is hung down from a side of the frame 31. An arrangement is also easily arrived at, in which the frame 31 does not provide support at the lower portion of its front portion but at side portions (two sides) of its lower portion and at two lower portions of its rear portion. A combination of these structures may also be employed.

Regarding the way to fix the cross-moving stage 41 to the stationary stage 40, other than clamping the cross-moving stage 41 to the stationary stage 40 with the bolt 45, the cross-moving stage 41 may be clamped from below or from a side portion.

The stationary stage 40 may incorporate the cross-moving stage 41. Furthermore, although the frame is of a Y-letter shape in this embodiment, it may be of a T-letter shape. Although the stage 41 is a cross-moving stage, it is not limited to this, and it suffices as far as it can adjust the position of the specimen. Therefore, a rotary stage added with a uni-directional stage may be used in place of the cross-moving stage.

In the above description, the focusing knobs, which are manually operated for retreating the objective lens and for performing re-focusing every time a manipulator is added and every time patch clamp is performed, are provided to the lower member of the frame. Hence, the distance between the stationary stage and the focusing knobs can be maintained as large as possible so that the stationary stage on which the manipulator is set and the hands that operate the focusing knobs will not interfere with each other. Also, an integral structure is employed for the stationary and cross-moving stages, in which the cross-moving stage is incorporated in the stationary stage.

To integrate the stationary stage and the moving stage, the main body of the cross-moving stage is fixed to the stationary stage. Thus, the main body of the cross-moving stage and the stationary stage can be synchronized as a vibration system by this arrangement as well. However, in the cross-moving stage 41, the guide member 41C is arranged between the main body 41A and the movable stage 41B, and the movable stage 41B is movable in the X and Y directions on the main body 41A. When a transmitted vibration is large, synchronization can cause a lag due to the guide member 41C.

Also, the stationary stage requires high mounting precision (the perpendicularity with respect to the objective lens), leading to an increase in cost.

An embodiment in which these drawbacks are improved will be described as a second embodiment.

(Second Embodiment)

Figure 6:
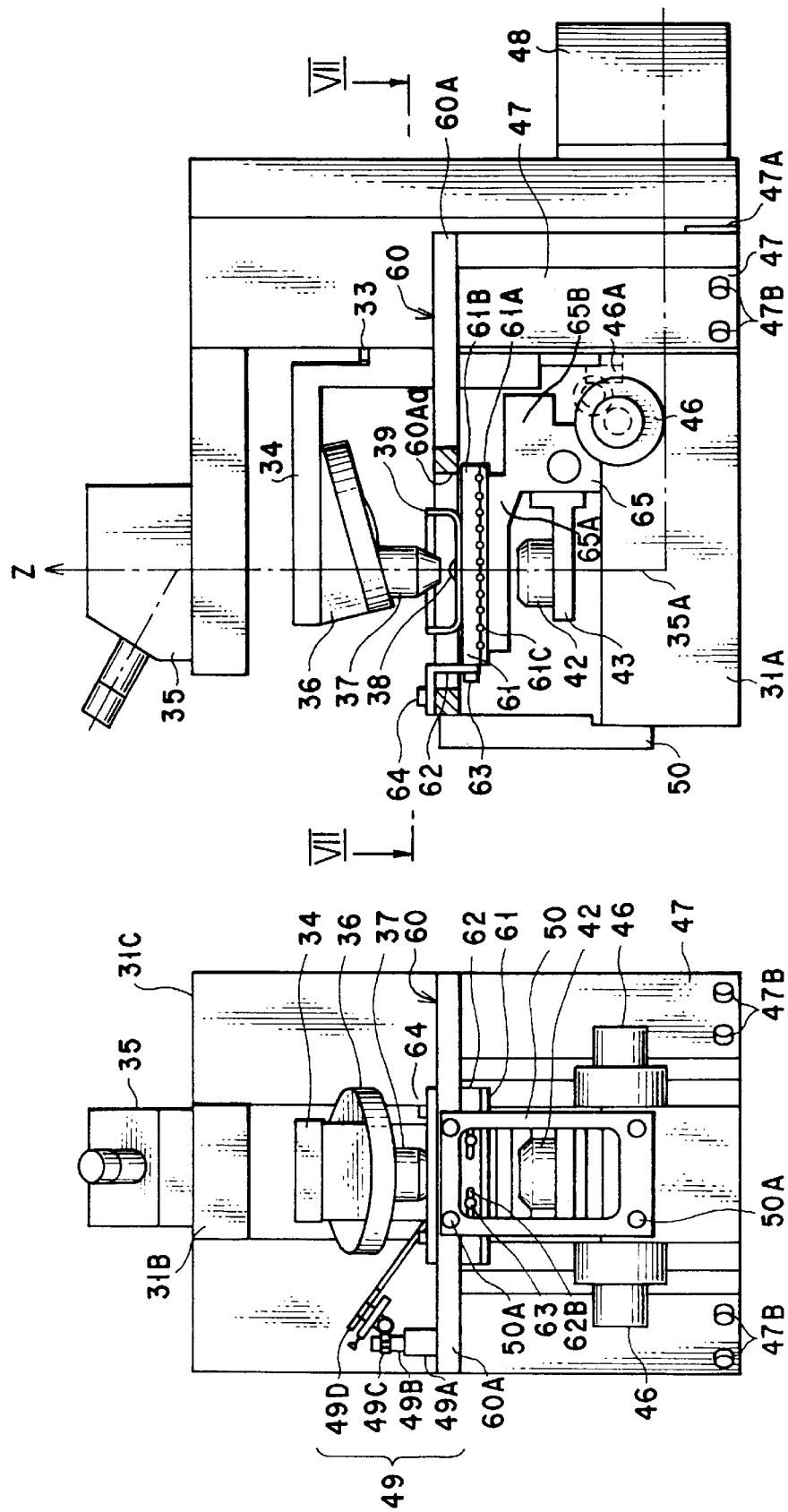
FIGS. 6A and 6B are side and front views, respectively, of an erect optical microscope according to the second embodiment of the present invention.
Figure 7:
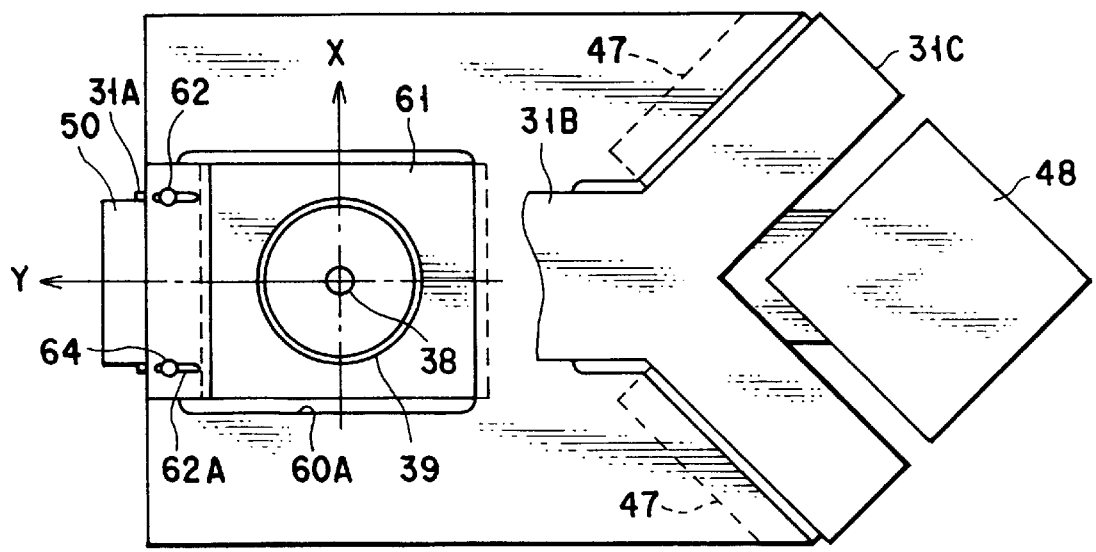
FIG. 7 is a sectional view taken along line VII—VII in FIG. 6A.

The arrangement of the second embodiment is basically the same as that of the first embodiment shown in FIGS. 2A, 2B, and 3. Thus, the same portions as those in the first embodiment are denoted by the same reference numerals and a detailed description thereof will be omitted, and only portions different from those of the first embodiment will mainly be described. FIG. 6A is a side view of the main body, and FIG. 6B is a front view of the main body. FIG. 7 is a sectional view of the main body taken along the line VII—VII of FIG. 6A. In the arrangement in FIGS. 6A, 6B, and 7, elements denoted by reference numerals 31, 33, 34, 35, 36, 37, 38, and 39 are identical to those shown in FIGS. 2A, 2B, and 3.

Elements denoted by reference numerals 60, 61, 62, 63, 64, and 65 are different from corresponding ones in FIGS. 2A, 2B, and 3. More specifically, a window portion 60A*a* is formed in a stage plate 60A of a stationary stage 60. One end side of the stationary stage 60 is fixed to a lower member 31A of a frame 31 with a support member 50, and the other end side of the stationary stage 60 is fixed to a support pillar 31C of the frame 31 with support members 47. The supporting/fixing structure of the frame 31 of the stationary stage 60 is the same as that of the first embodiment.

A condenser rest 65 is placed on the lower member 31A of the frame 31. A leg portion 65B is formed on one end portion side of a plate-like rest plate 65A of the condenser rest 65 to extend downward, and this leg portion 65B is fixed to the upper surface side of the lower member 31A of the frame 31, thereby mounting the condenser rest 65 to the frame 31.

A condenser vertically moving portion 43 is provided to the leg portion 65B of the condenser rest 65, and a condenser lens 42 is fixedly held on the upper side of the condenser vertically moving portion 43.

The condenser rest 65 incorporates a mechanism for vertically moving the condenser vertically moving portion 43. The main body of a cross-moving stage 61 that can move in the X- and Y-axis directions and serves as a moving stage is fixed on the rest plate 65A of the condenser rest 65.

In the cross-moving stage 61, a guide member 61C is arranged between a main body 61A and a movable stage 61B, and the movable stage 61B can move on the main body 61A in the X and Y directions. A connecting member 62 having an L-shaped section is an L-shaped angle. The connecting member 62 is inverted, and its vertical surface side is fixedly mounted to the side surface of the movable body of the cross-moving stage 61 with bolts (screws) 63. The other surface (upper surface) of the connecting member 62 is fixed with bolts (screws) 64 to overlap the upper edge portion on the side of the window portion 60A*a* of the stationary stage 60, to which the support member 50 is fixed. Screw holes 62A are formed in the connecting member 62 in order to fix the bolts 64 to the connecting member 62 by clamping. The screw holes 62A are elongated clearance holes extending in the Y-axis direction, and screw holes 62B for the bolts 63 are elongated clearance holes extending in the X-axis direction. When the bolts 63 and 64 are loosened, the movable body of the cross-moving stage 61 can move along the X and Y axes within the range of the degree of freedom of these clearance holes. Hence, after the position of the cross-moving stage 61 is adjusted, when the bolts 63 and 64 are fastened, the cross-moving stage 61 can be positioned and fixed at a desired position.

In this arrangement, the connecting member 62 can be fixed/moved on the stationary stage 60 by operating the bolts 64, and can also be fixed/moved on the cross-moving stage 61. More specifically, the clearance holes for the bolts 63 of the connecting member 62 are elongated holes extending in the X direction, and the clearance holes for the bolts 64 of the connecting member 62 are elongated holes extending in the Y direction (see FIG. 7). When the bolts 63 and 64 are loosened, the cross-moving stage 61 is movable in the X and Y directions within the range of the degree of freedom obtained from the relationship between the screw holes 62A and 62B and the bolts 63 and 64. When the bolts 63 and 64 are fastened, the cross-moving stage 61 is fixed at a position where the bolts 63 and 64 are clamped.

Accordingly, when selecting a cell to be clamped by the electrodes of the set manipulator, the bolts 63 and 64 are loosened, and the operation knob of a known movement adjusting mechanism (not shown) which performs reduction with a rack, a pinion, and the like and which is held by the cross-moving stage 61 is operated, thereby moving the cross-moving stage 61 in the X and Y directions. A specimen case 39 on the cross-moving stage 61 is adjusted by being moved in the X and Y directions, so that the position of a target cell of a cell 38 in the specimen case 39 is set within the observation field of view of the microscope.

When the target cell is determined, an objective lens 37 is retreated upward by operating focusing knobs 46. Assuming that four manipulators are to be set, several to several tens of cell groups exist in this state in the center of the observation field of view. In the subsequent operation, the cross-moving stage 61 is not moved. Once the cell is clamped, the cross-moving stage 61 must not be moved. If the cross-moving stage 61 is moved, the clamped cell is undesirably released.

When a target cell is determined and the objective lens 37 is retreated upward by operating the focusing knobs 46, the cross-moving stage 61 is fixed by clamping the bolts 64 and 63. The main body portion of the cross-moving stage 61 is mounted on the rest plate 65A of the condenser rest 65, and the movable body of the cross-moving stage 61 can move on this main body portion in the X and Y directions. Thus, when the bolts 64 and 63 are fastened, the movable body of the cross-moving stage 61 is fixed to the stationary stage 60 with the connecting member 62, and the cross-moving stage 61 is firmly fixed on the rest plate 65A of the condenser rest 65 and the stationary stage 60. As a result, the cross-moving stage 61 is integrally fixed to the stationary stage 60.

When the cross-moving stage 61 is fixed, a manipulator 49 is set on the stationary stage 60, and the electrodes of the manipulator 49 are inserted to be close to the specimen (cell) 38 in the specimen case 39. An objective lens 37 having a high magnification is selected by operating a revolver 36. The selected objective lens 37 having a high magnification is moved downward again to the focusing position by operating the focusing knobs 46. Thereafter, while observing the cell and the electrodes through the eyepiece, the positions of the electrodes of the manipulator 49 are finely adjusted, thereby clamping the target cell.

Thereafter, the objective lens 37 is retreated upward in order to set the second manipulator, and the same operation as that described above is repeated.

In the series of operations described above, what influences the clamp operation of the manipulator 49 is the operation of the focusing knobs 46 and an external vibration. A vibration caused by the operation of the focusing knobs 46 and that caused by the external vibration are transmitted as different vibrations to the manipulator 49, the cross-moving stage 61, and the like due to different vibration systems.

In the arrangement of this embodiment, the movable portion of the cross-moving stage 61 and the stationary stage 60 are connected to each other with the connecting member 62. Accordingly, the vibration systems of the two stages 61 and 60 are synchronized. Even if a vibration is transmitted to the cross-moving stage 61 and the stationary stage 60, the cell and the electrodes move simultaneously, so that the clamped cell will not be undesirably released. More specifically, since the manipulator 49 on the stationary stage 60 and the specimen case 39 on the cross-moving stage 61 vibrate completely in the same manner, no vibration relatively exists between the manipulator 49 and the specimen case 39, and the clamped cell will not be undesirably released.

In this embodiment, the moving table is held by the condenser rest fixed on the frame, and the movable body of the moving table and the stationary table are fixed with each other with the connecting member by screwing, so that the vibration system of the movable body of the moving table and that of the stationary stage become common. Accordingly, should a vibration occur, the manipulator on the stationary stage and the specimen case on the moving table vibrate completely in the same manner. Thus, no vibration relatively exists between the manipulator and the specimen case, and the clamped cell will not be undesirably released.

The movable body of the moving table and the stationary stage are fixed with the connecting member. The fixing structure for this is clamp fixing employing clearance holes having a degree of freedom and bolts (screws). If the bolts (screws) are loosened, the movable body of the moving table can be position-adjusted within the range of this degree of freedom, and thus positioning and fixing of the cell can be realized with a simple arrangement. Accordingly, the cost of the microscope can be decreased.

In the first embodiment, the main body of the cross-moving stage is fixed to the stationary stage, and the main body of the cross-moving stage and the stationary stage are synchronized as the vibration system. However, a guide member, e.g., a ball bearing, is provided between the movable body on which the cell is placed and the main body of the cross-moving stage, and a lag may occur in synchronization at least due to this guide member. In contrast to this, in the second embodiment, such a lag in synchronization does not occur as the movable body of the moving table and the stationary stage are fixed to each other with screws.

In the first embodiment, the upper surface of the cross-moving stage 41 must be roughly in focus with respect to the objective lens 37 within the range (the range of the degree of freedom of movement) of its X and Y strokes. In this case, high-mounting precision is needed for the stationary stage. In contrast to this, in the second embodiment, as the support system of the stationary stage 60 is separate from that of the cross-moving stage 61, the stationary stage 60 need not have high precision as described above. More specifically, in the first embodiment, high mounting precision (perpendicularity with respect to the objective lens) is needed for the stationary stage. However, in the second embodiment, focusing with respect to the objective lens is performed after the moving stage (cross-moving stage 61) is fixed, and a clamp operation by the manipulator is performed. Thus, it suffices as far as the manipulator is firmly fixed, and no particular problem arises even if the stationary stage 60 is tilted.

In the second embodiment, the connecting member 62 is provided to the front surface side of the microscope. However, the connecting member 62 may be provided to the deep side or right or left side of the microscope, as a matter of course. The position where the connecting member 62 is mounted is not limited to only the front surface side of the microscope, near the deep side (rear surface side) of the microscope, or either the right or left side of the microscope, but connecting members 62 can be mounted to either front and rear, right and left, front right and front left, or deep right and deep left portions of the microscope, or can be mounted to portions other than these portions. Although the stage 61 can move in the crossing directions, it suffices if it can adjust the position of the specimen and accordingly is a moving stage. Therefore, a structure obtained by adding the function of a uni-directional moving stage to a stationary stage can be employed instead.

Figure 8:
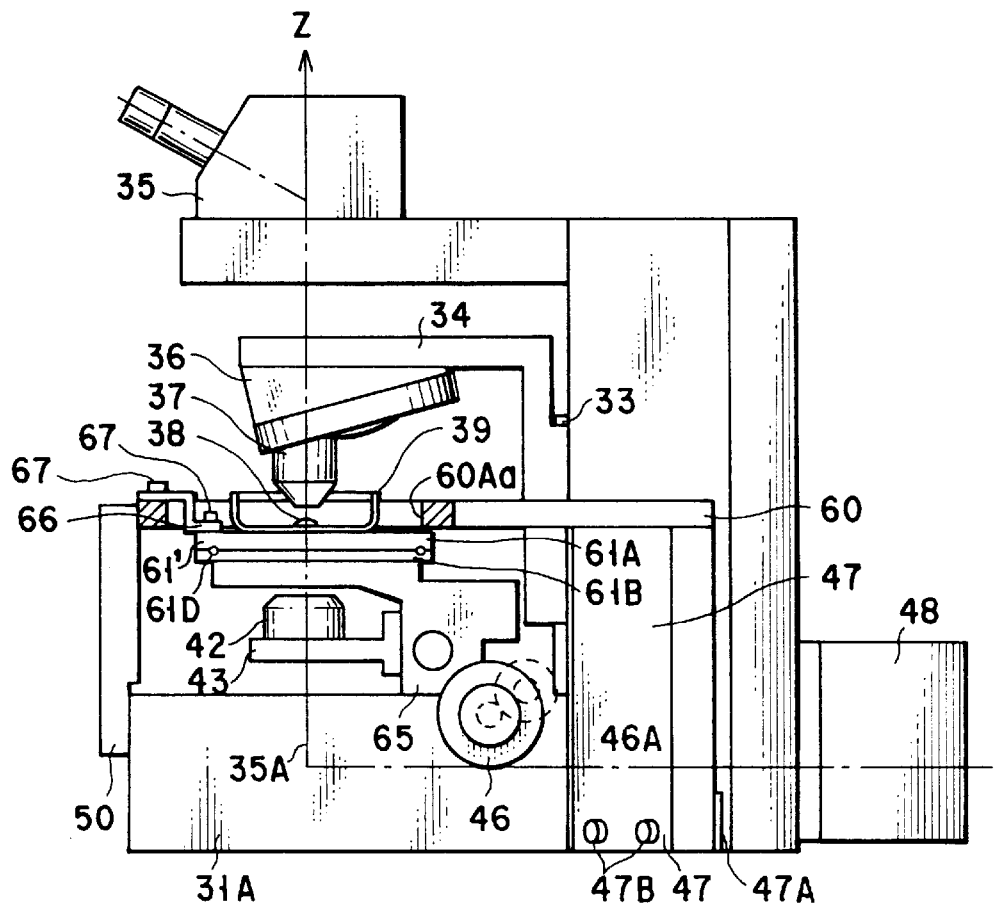
FIG. 8 is a side view of an erect optical microscope as a modification of the first and second embodiments of the present invention.

A modification of the first and second embodiments will be described with reference to FIG. 8. In this modification, the connecting member and the cross-moving stage differ from those of the second embodiment. More specifically, a condenser rest 65 incorporates a mechanism for vertically moving a condenser vertically moving portion 43, and the main body of a cross-moving stage 61' that serves as a moving stage and that can move in the X- and Y-axis directions is fixed on a rest plate 65A of the condenser rest 65.

In the cross-moving stage 61', a guide member 61D is arranged between a main body 61A and a movable stage 61B, and the movable stage 61B can move on the main body 61A in the X and Y directions. The cross-moving stage 61' can be regarded as being different from the cross-moving stage 41 of the first embodiment and the cross-moving stage 61 of the second embodiment. The cross-moving stage 61' can be regarded as a stage capable of rotation and horizontal movement, while the cross-moving stage 41 of the first embodiment and the cross-moving stage 61 of the second embodiment can be regarded as stages capable of only horizontal movement.

In the present invention, however, since the type of the specimen moving stage is not limited, the type of the cross-moving stage can also be arbitrarily changed.

A connecting member 66 having a Z-shaped section is a Z-shaped angle. The connecting member 66 is arranged in the Z-letter shape, and its vertical surface side is fixedly mounted to the side surface of the movable body of the cross-moving stage 61' with bolts (screws) 67. The other surface (upper surface) of the connecting member 66 is fixed with bolts (screws) 67 to overlap the upper edge portion of a side of a window portion 60A$a$ of the stationary stage 60 to which a support member 50 is fixed.

In this modification, only the type of connection of the cross-moving stage 61' and the function of the cross-moving stage 61' are different from those of the second embodiment, and the other functions are identical to those of the second embodiment.

The above embodiments and modification exemplify an erect microscope. Optical microscopes include not only an erect microscope but also an inverted microscope. Embodiments of the present invention which is applied to an inverted microscope will be described.

(Third Embodiment)

Figure 9:
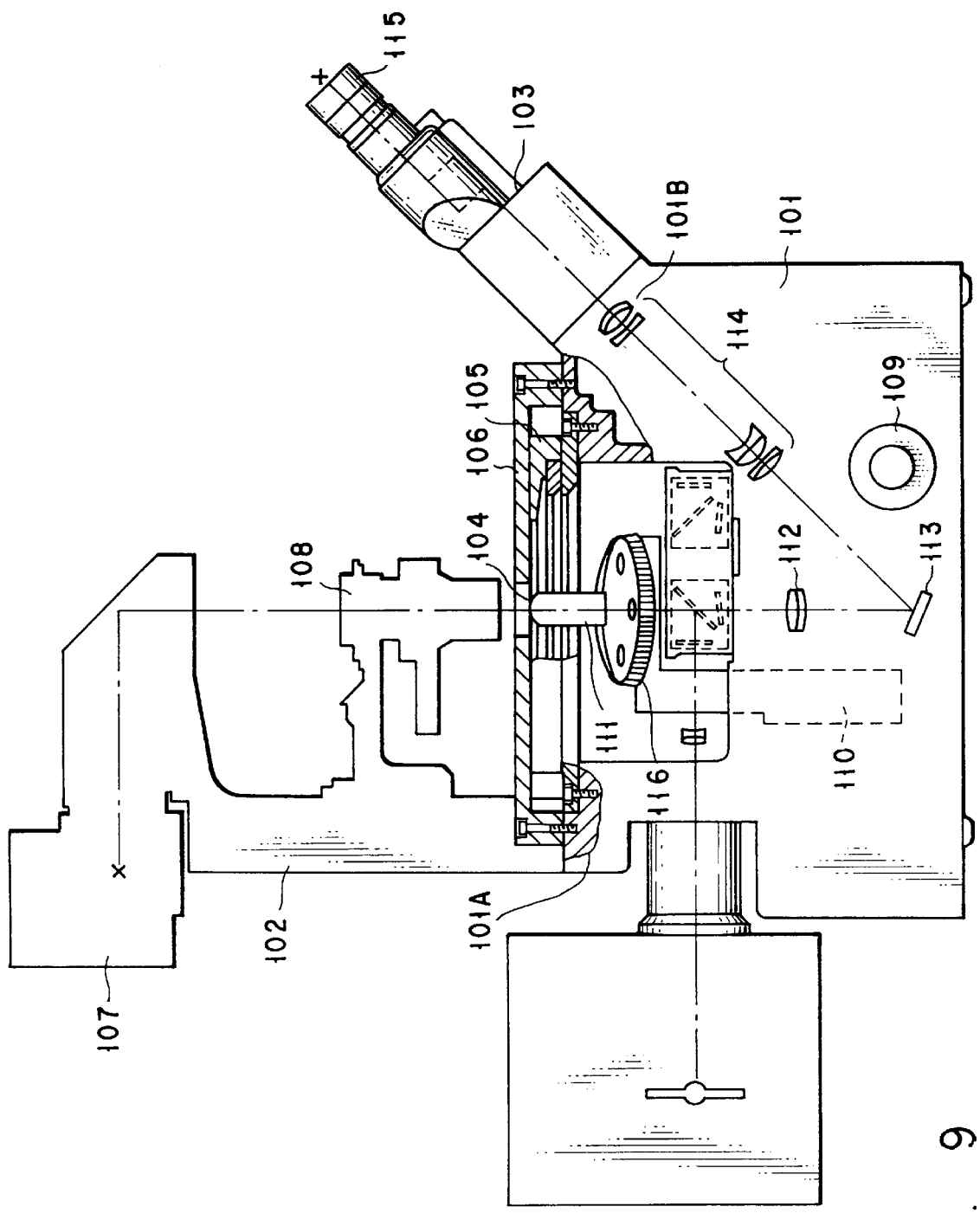
FIG. 9 schematically shows the arrangement of an inverted optical microscope according to the third embodiment of the present invention.
Figure 10:
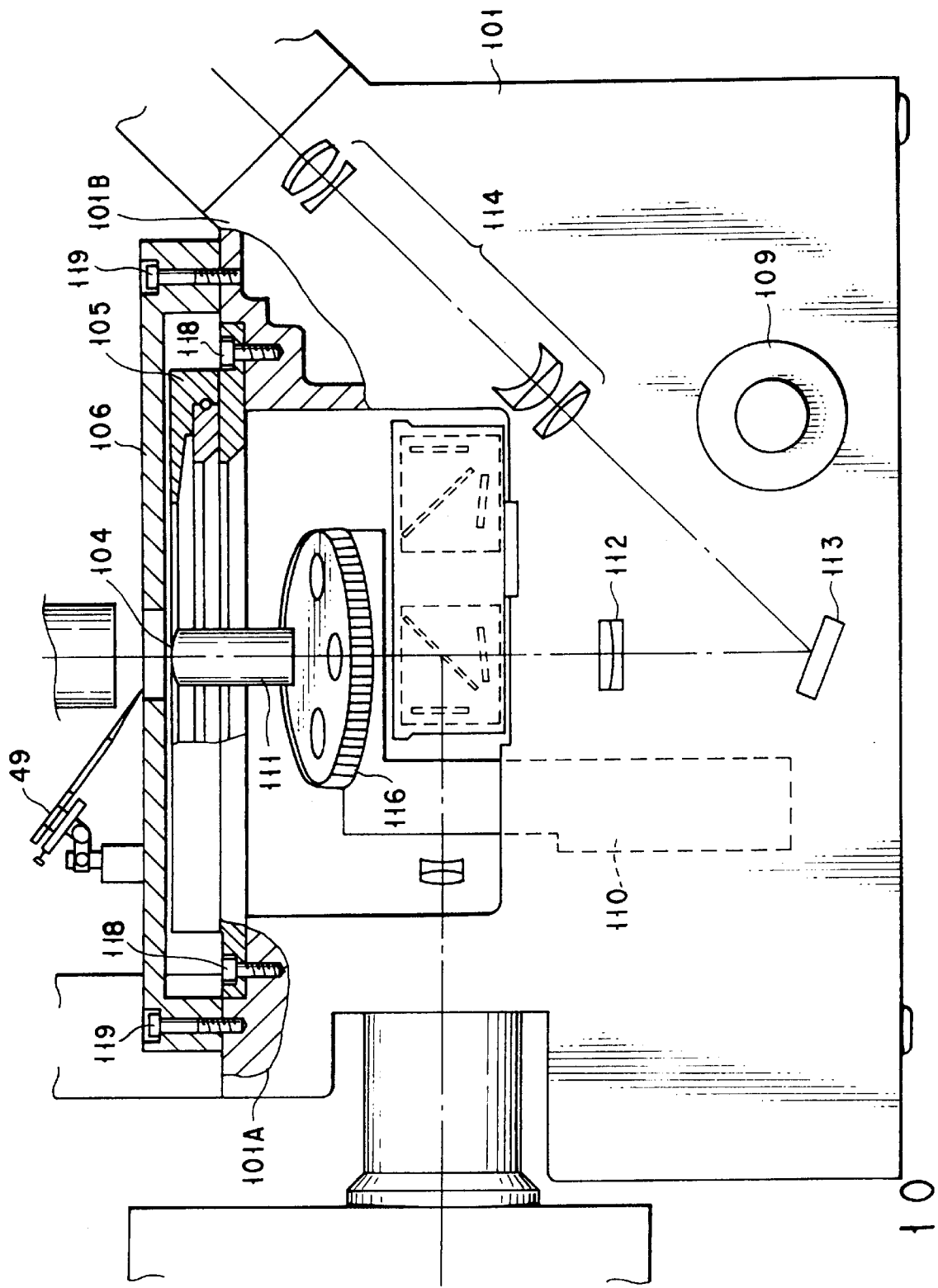
FIG. 10 is a schematic side view showing the arrangement of the main part of FIG. 9.

FIGS. 9 and 10 show an inverted microscope according to an embodiment of the present invention.

FIG. 9 is a side view showing the schematic entire arrangement of the inverted microscope of this embodiment, and FIG. 10 is an enlarged view of the main part of the present invention. Referring to FIGS. 9 and 10, an illumination light source pillar 102 for supporting a lamphouse 107 incorporating an illumination light source is provided upright on a box-shaped frame 101.

In this inverted microscope, the lamphouse 107 is held by the illumination light source pillar 102 provided upright on the frame 101, and illumination light is irradiated from above downward to the frame 101 below. A condenser lens 108 is mounted to the illumination light source pillar 102. Illumination light can be irradiated through the condenser lens 108 toward a stationary stage 106 on the frame 101.

A window is formed at the center of the stationary stage 106. A specimen moving stage 105 is provided to move in the X and Y directions within this window portion, thereby holding and moving a specimen 104. A window is formed at the center of the specimen moving stage 105. If the specimen case (petri dish) is placed such that the specimen 104 is located within this window, the image of the specimen 104 illuminated by the illumination light emerging from the lamphouse 107 can be seen from the inner side of the window. An objective lens 111 is placed on the side of this window (i.e., in the frame 101). The specimen image is guided by an optical system consisting of an imaging lens 112, a reflecting mirror 113, and relay lenses 114 to an observation lens barrel 103 arranged on a side surface of the frame 101 such that it is directed obliquely upward. Then, the specimen image is observed through an eyepiece 115 provided at the distal end of the observation lens barrel 103.

In the same manner as in the first and second embodiments, the plurality of objective lenses 111 having different magnifications are mounted to a revolver 116, and are arranged in the frame 101. The revolver 116 is rotatably mounted to a revolver support stand 110. The revolver support stand 110 can move toward and away from the specimen moving stage 105. Hence, the revolver support stand 110 can be moved forward and backward in the direction of the optical axis of the condenser lens 108, thereby adjusting the position of the objective lens 111 so as to focus the specimen image.

The revolver support stand 110 is provided with a moving mechanism utilizing a rack and a pinion for the purpose of adjusting the position of the objective lens 111. Focusing knobs 109 are arranged on the outer side of the frame 101 as knobs for driving this moving mechanism.

An illumination stand portion 101A is provided to support the illumination light source pillar 102. The observation lens barrel 103 is mounted on the frame 101, as described above. A lens barrel stand portion 101B is provided on the frame 101 in order to support the observation lens barrel 103.

In this embodiment, the illumination stand portion 101A and the lens barrel stand portion 101B are used for supporting the stationary stage 106 and the specimen moving stage 105. These stand portions have strong structures and are thus optimum for holding constituent elements that can be easily influenced by a vibration. Accordingly, in this embodiment, the specimen moving stage 105 for holding and moving the specimen 104 and the stationary stage 106 for fixing a manipulator 49 are mounted with a fastening means, e.g., machine screws (screws), such that they extend across the illumination stand portion 101A and the lens barrel stand portion 101B of the frame 101. The specimen moving stage 105 and the stationary stage 106 are mounted very close to each other by fastening and fixing their end portions, so that their stage surfaces become parallel mount surfaces. Accordingly, the specimen moving stage 105 and the stationary stage 106 constitute an almost integral structure, and are also almost integral with the frame 101.

Although not shown, the specimen and the specimen case (petri dish) of the third embodiment are similar to those of the first and second embodiments. The arrangement and position of the manipulator 49 are also similar to those of the first and second embodiments.

In this arrangement, to perform actual observation, the lamp of the lamphouse 107 is lit by turning on a power switch (not shown) incorporated in the frame 101. Light emerging from the lamphouse 107 is condensed on the specimen 104 by a collector lens (not shown) incorporated in the transmission illumination pillar 102 and the condenser lens 108. The revolver support stand 110 and the objective lenses 111 held by the revolver 116 rotatably mounted on the revolver support stand 110 are vertically moved by manually operating the focusing knobs 109, thereby performing focusing.

Light transmitted through the specimen and the objective lens 111 is guided to the observation lens barrel 103 by the imaging lens 112, the reflecting mirror 113, and the relay lenses 114, and an enlarged image is observed through the eyepiece 115.

At this time, in order to set the condenser lens 108 at an optimum position, it is vertically moved with a known mechanism (not shown), e.g., a rack and a pinion, which converts a rotational movement into a linear movement, by operating a knob (not shown) mounted on the illumination pillar 102. In order to set the specimen at the observation position, the specimen moving stage 105 is moved in the X and Y directions by operating the operation knob of a known reduction moving mechanism (not shown), e.g., a rack and a pinion, which is supported by the specimen moving stage 105. The specimen 104 on the specimen moving stage 105 is moved in the X and Y directions, thereby adjusting the target specimen to be located at an optimum position in the observation field of view.

The operation of the manipulator is similar to that of the first embodiment except that the objective lens 111 need not be retreated since this microscope is an inverted microscope. Accordingly, most of the problems caused by vibration accompany the switching operation of the objective lenses 111 of the revolver 116.

In the third embodiment, since the mount surface of the stationary stage 106 and the mount surface of the specimen moving stage 105 are parallel to each other, they can be machined in the same machining step, leading to a higher relative position precision. A magnifying lens, a stereoscopic microscope, and the like may be placed on the stationary stage. Then, a support structure which can easily combine ordinary observation and observation with a stereoscopic microscope or can easily switch them can be obtained, widening the application range. Since the fixing portion of the stationary stage and that of the specimen moving stage can be set to be located at almost the same positions and since the stationary stage and the specimen moving stage can be fixedly supported respectively by the transmission illumination base portion and the observation lens barrel base portion of the high-strength frame of the main body of the housing of the microscope, relative vibration between the stationary stage and the specimen moving stage can be decreased. In addition, since the stationary stage and the specimen moving stage are almost integral, even if a vibration is transmitted, they receive almost the same vibration. Since the stationary stage and the specimen moving stage are synchronized, almost no relative vibration exists, and it is unlikely that the object clamped by the manipulator is released.

An embodiment in which the specimen moving stage 105 of the third embodiment is replaced with a rotary stage will be described as the fourth embodiment.

(Fourth Embodiment)

Figure 11:
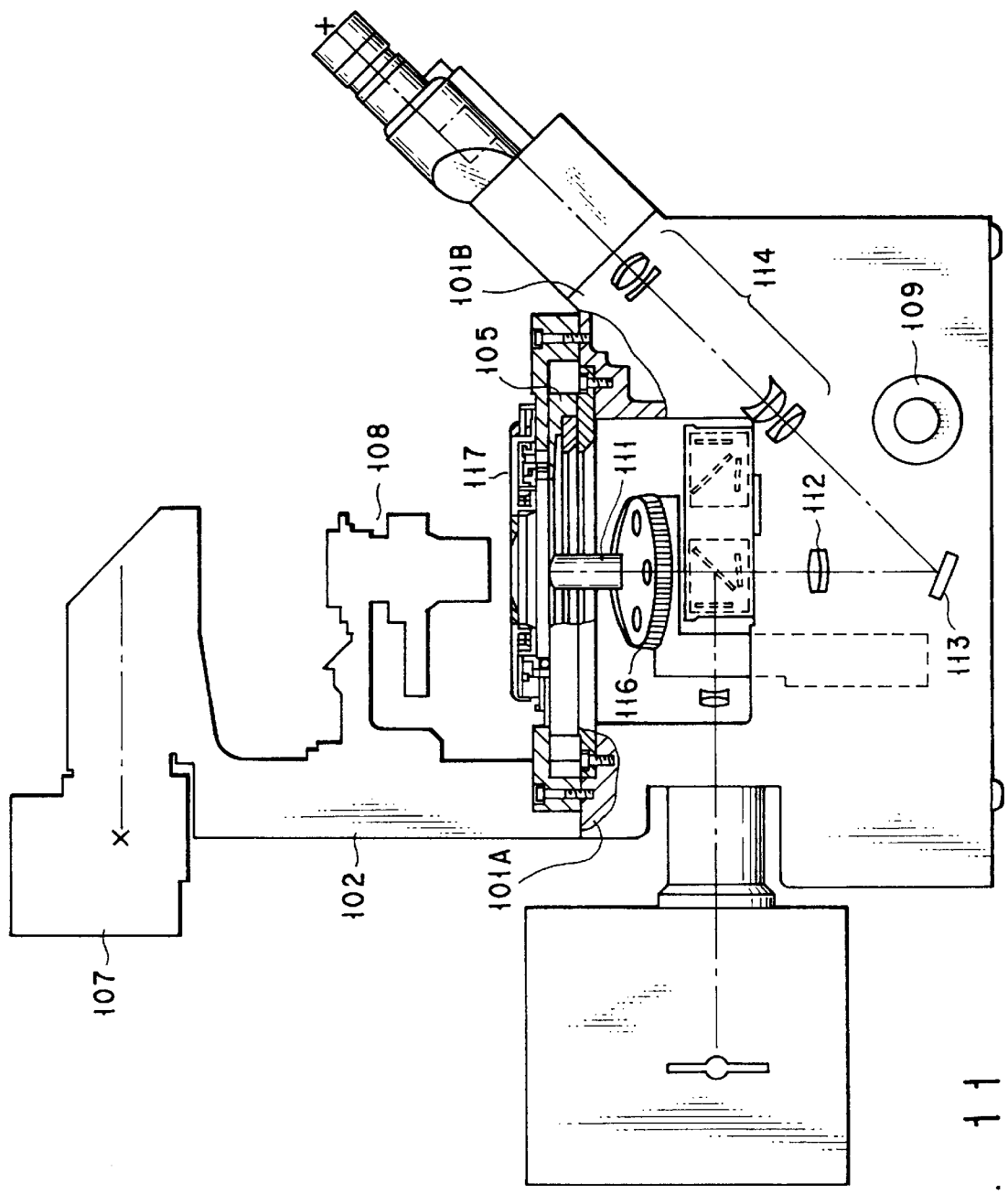
FIG. 11 schematically shows the arrangement of an inverted optical microscope according to the fourth embodiment of the present invention.
Figure 12:
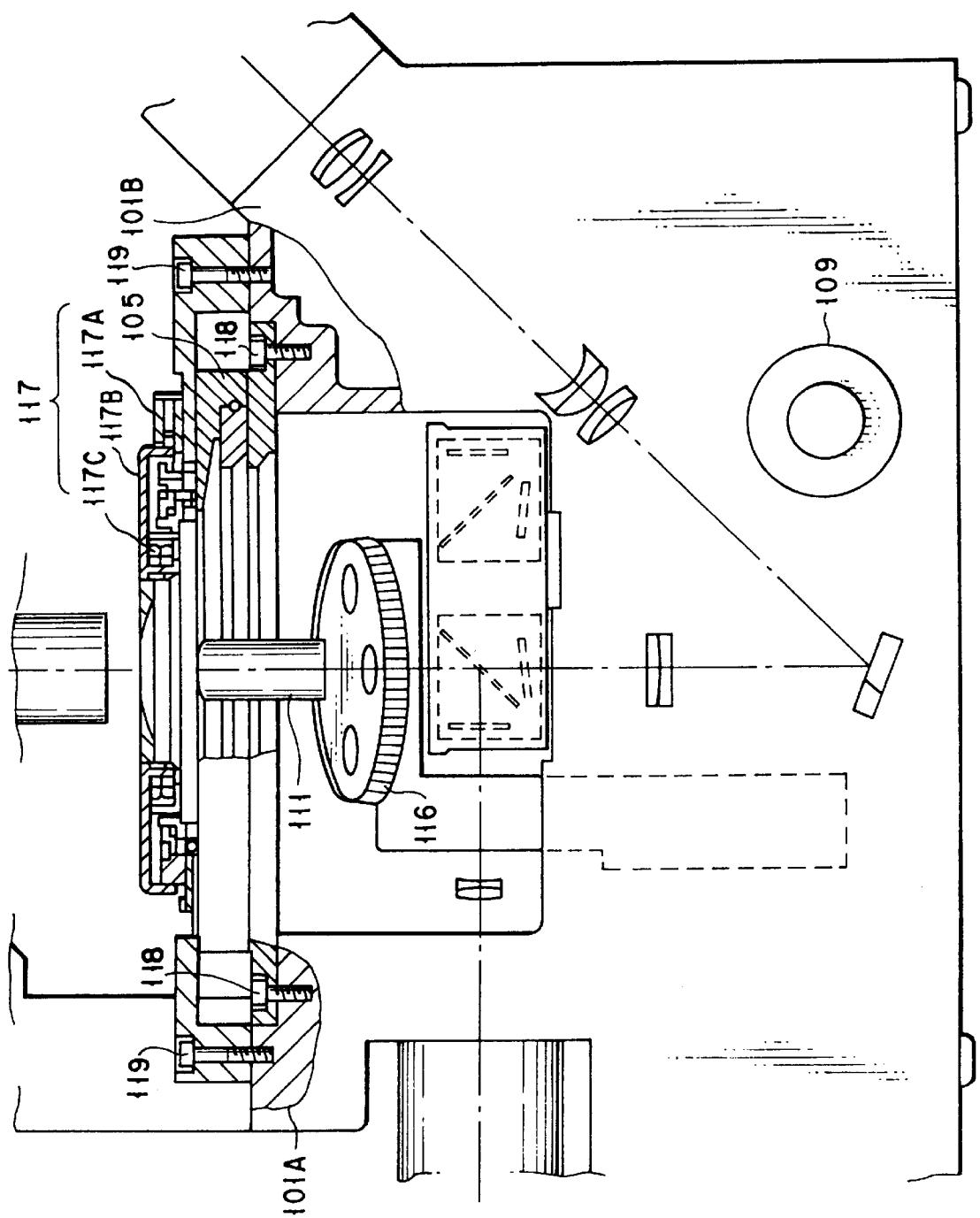
FIG. 12 is a schematic side view showing the arrangement of the main part of FIG. 11.

The fourth embodiment exemplifies a case wherein the specimen moving stage 105 shown in FIGS. 9 and 10 is replaced by a rotary stage, as shown in FIGS. 11 and 12. FIG. 11 shows the schematic overall arrangement of a microscope of this embodiment, and FIG. 12 is an enlarged view of the main part of the same. The arrangement of the fourth embodiment is basically the same as that of the third embodiment except that the specimen moving stage 105 shown in FIGS. 9 and 10 is replaced by a rotary stage 117. In the fourth embodiment, as shown in FIGS. 11 and 12, in place of the specimen moving stage 105, the rotary stage 117 employing a turntable structure is firmly mounted with a fixing means, e.g., machine screws, so as to extend across an illumination stand portion 101A and a lens barrel stand portion 101B of a frame 101. The rotary stage 117 comprises a main body 117A and a rotary stage portion 117B rotatably held by a bearing 117C to the main body 117A. The rotary stage 117 is fixed at its main body 117A.

A manipulator is set on the rotary stage portion 117B. When the stationary stage employs the structure of the rotary stage 117 in this manner, when a cell is to be pierced by the manipulator with a needle, the manipulator can be rotated in the needle piercing direction by adjusting the rotary position of the rotary stage portion 117B, thereby increasing the operability.

Various embodiments of the present invention have been described above. The embodiments of the present invention include the following contents.

(1) A microscope which incorporates a manipulator and in which an objective lens mounted to a revolver is vertically moved by vertically moving the revolver, thereby performing focusing, characterized in that a stationary stage on which the manipulator is arranged and a specimen moving stage are integrally fixed to a frame of the microscope.

This arrangement corresponds to the first to fourth embodiments.

With this arrangement, the stationary stage on which the manipulator is arranged and the specimen moving stage on which a specimen is placed constitute an integral structure, which is fixed to the frame of the microscope. Thus, the stationary stage and the specimen moving stage have a common vibration system. Even if the stationary stage and the specimen moving stage are exposed to a vibration, their vibrations are synchronized, so that the cell and the electrodes of the manipulator vibrate in the same manner. In this manner, since the cell and the electrodes of the manipulator vibrate in synchronism with each other upon being exposed to an external vibration, the cell clamped by the manipulator will not be undesirably released.

(2) An arrangement according to the above item (1), characterized in that the stationary stage is fixed at the front portion and the two sides of the rear portion of the frame.

With this arrangement, since the fixing portion of the stationary stage and that of the specimen moving stage are firmly fixed respectively to the front and rear portions of the frame of the microscope, the stability of the microscope is remarkably increased, and the microscope is less influenced by a vibration.

(3) An arrangement according to the above item (1), characterized in that the stationary stage and the specimen moving stage are fixed by utilizing the lens barrel support stand portion and the illumination support pillar stand portion of the frame of the microscope.

This arrangement corresponds to the third and fourth embodiments.

With this arrangement, since the fixing portion of the stationary stage and that of the specimen moving stage are firmly fixed to the frame by utilizing the stand portions of the frame of the microscope which have a large strength, the stability of the microscope is remarkably increased, and the microscope is less influenced by a vibration.

(4) An arrangement according to the above items (1) and (2), wherein since operation knobs (focusing knobs) of a mechanism that vertically moves the revolver are arranged near the lower portion of the frame, a sufficient distance can be maintained between the stationary stage and the moving stage.

This arrangement corresponds to the first to fourth embodiments.

The operation knobs are arranged near the lower portion of the frame in order to maintain a sufficient distance between the stationary stage and the moving stage. Therefore, the stationary stage and the moving stage will not interfere with the operator's hand during operation of the operation knobs, and an interference will not easily occur among the stationary and moving stages, the support portions of the stationary and moving stages, and the operator's hand during operation of the operation knobs. Hence, a vibration caused by the interference is suppressed, thereby suppressing inadvertent release of a clamped cell.

(5) A microscope characterized in that operation knobs (focusing knobs) of a mechanism that vertically moves the revolver are arranged near the lower portion of the frame, the specimen moving stage (cross-moving stage or the like) is fixed to the stationary stage to be capable of moving the specimen, and the stationary stage is integrally fixed to the frame through a support member.

This arrangement corresponds to the first and second embodiments.

This arrangement is effective in a structure specific to an erect microscope in which a lens barrel is arranged above the frame of the microscope and a revolver is arranged between the stationary stage and the lens barrel. The operation knobs are arranged near the lower portion of the frame in order to maintain a sufficient distance between the stationary stage and the moving stage. Accordingly, the stationary stage and the moving stage will not interfere with the operator's hand during operation of the operation knobs, and occurrence of a vibration is suppressed. In addition, since the stationary stage is integrally fixed to the frame through a strong support member, the vibration will not be amplified. Since the stationary stage and the moving stage are integral, they have a common vibration system, and a clamped cell will not be easily let loose by accident upon application of a vibration in the patch clamp of a cell.

(6) A vertically movable objective lens type microscope comprising a manipulator, characterized in that a stationary stage on which the manipulator is arranged is fixed to a frame of the microscope through a support member, a stage rest is mounted to the frame, a specimen moving stage on which a specimen is placed is mounted to the stage rest such that its movable portion is movable, and the stationary stage and the movable portion of the specimen moving stage are fixed to each other with a connecting member that connects and fixes them in a desired state.

This arrangement corresponds to the second embodiment.

This arrangement is effective in the structure specific to an erect microscope in which a lens barrel is arranged above the frame of the microscope and a revolver is arranged between the stationary stage and the lens barrel. The stationary stage is firmly fixed to the frame of the microscope, and the moving stage is fixed to the stage rest mounted to the frame. When the connecting member is loosened, the movable portion of the moving stage can move freely. Accordingly, when the movable portion of the moving stage is position-adjusted in this state in order to adjust the specimen position, and thereafter the movable portion is fixed with the connecting member, the moving stage and the stationary stage are integrally supported. In addition to the effects of items (1) and (2), since the moving stage is supported independently of the stationary stage when the connecting member is loosened, the stationary stage need not have high mounting precision (perpendicularity with respect to the optical axis of the objective lens). Furthermore, once fixing is performed with the connecting member, the vibration system of the moving stage becomes common with that of the stationary stage. As the electrodes of the manipulator vibrate []in synchronism with an external vibration in units of cells, the clamped cell will not be undesirably released.

(7) A microscope which comprises a manipulator and in which an objective lens mounted to a revolver is vertically moved by vertically moving the revolver, thereby performing focusing, characterized in that a stationary stage on which the manipulator is arranged is fixed to a frame of the microscope through a support member, a stage rest is mounted to the frame, a specimen moving stage on which a specimen is placed is mounted to the stage rest such that its movable portion is movable, the stationary stage and the movable portion of the specimen moving stage are fixed to each other with a connecting member that connects and fixes them in a desired state, and operation knobs (focusing knobs) of a mechanism that vertically moves the revolver are arranged near the lower portion of the frame.

This arrangement corresponds to the second embodiment.

This arrangement is effective in the structure specific to an erect microscope in which a lens barrel is arranged above the frame of the microscope and a revolver is arranged between the stationary stage and the lens barrel. The stationary stage is firmly fixed to the frame of the microscope, and the moving stage is fixed to the stage rest mounted to the frame. When the connecting member is loosened, the movable portion of the moving stage can move freely. Accordingly, when the movable portion of the moving stage is position adjusted in this state in order to adjust the specimen position, and thereafter the movable portion is fixed with the connecting member, the moving stage and the stationary stage are integrally supported.

In addition to the effects of items (1), (2), (4), and (5), since the moving stage is supported independently of the stationary stage when the connecting member is loosened, the stationary stage need not have high mounting precision (perpendicularity with respect to the optical axis of the objective lens). Furthermore, once fixing is performed with the connecting member, the vibration system of the moving stage becomes common with that of the stationary stage. As the electrodes of the manipulator vibrate in synchronism with an external vibration in units of cells, the clamped cell will not be undesirably released.

As has been described above in detail, according to the present invention, there is provided an optical microscope in which, upon operating the focusing knobs, the operator's hand will not easily interfere with the other constituent elements of the microscope, and whereby even if a vibration is applied, the influence of the vibration can be suppressed from acting on the manipulator, so that a cell clamped by the manipulator will not be undesirably released.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An erect movable objective lens type optical microscope comprising:

a frame;

said frame comprising a Y-shaped body and an arm member connected to said Y-shaped body, said Y-shaped body comprising first, second and third members arranged and interconnected to form a substantially Y-shaped configuration, said first and second members being dimensioned to reach a summit of said arm member;

an observation optical portion having an objective lens, said observation optical portion being movably provided on said frame;

said third member of said Y-shaped body being located immediately below an optical axis of said observation optical portion;

a stage portion having a specimen moving stage, and a stationary stage adapted to receive a manipulator for manipulating a specimen provided on said specimen moving stage, said stage portion being fixedly provided on said frame;

a moving mechanism, provided on said frame, for moving said observation optical portion and said stage portion relative to each other; and a vibration synchronizing mechanism, including a connecting member connected to said stationary stage and said specimen moving stage, for synchronizing a vibration system of said stationary stage and a vibration system of said specimen moving stage.

2. The microscope according to claim 1, wherein said moving mechanism includes at least one focusing knob provided on a lower portion of said frame.

3. The microscope according to claim 1, wherein said stationary stage and said specimen moving stage of said stage portion are integrally fixed as one piece to front and rear portions of said frame.

4. The microscope according to claim 1, wherein said connecting member connects said stationary stage and a fixed side of said specimen moving stage.

5. The microscope according to claim 1, wherein said connecting member connects said stationary stage and a moving side of said specimen moving stage.

6. An erect movable objective lens type optical microscope comprising:

a frame;

an observation optical portion having an objective lens, said observation optical portion being movably provided on said frame;

a stage portion having a specimen moving stage, and a stationary stage adapted to receive a manipulator for manipulating a specimen provided on said specimen moving stage, said stage portion being fixedly provided on said frame;

a moving mechanism, provided on said frame, for moving said observation optical portion and said stage portion relative to each other; and a vibration synchronizing mechanism, including a connecting member connected to said stationary stage and said specimen moving stage, for synchronizing a vibration system of said stationary stage and a vibration system of said specimen moving stage;

wherein said frame comprises a pillar portion and a lower member;

wherein said stationary stage comprises a stage plate having a hole therein, a first support member having a first end side fixed to a first end side of said stage plate and a second end side fixed to said pillar portion of said frame, and a second support member having a first end side fixed to a second end side of said stage plate and a second end side fixed to said lower member of said frame; and wherein said specimen moving stage is coupled to said hole in said stage plate.

7. The microscope according to claim 6, wherein said moving mechanism includes at least one focusing knob provided on a lower portion of said frame.

8. The microscope according to claim 6, wherein said stationary stage and said specimen moving stage of said stage portion are integrally fixed as one piece to front and rear portions of said frame.

9. The microscope according to claim 6, wherein said connecting member connects said stationary stage and a fixed side of said specimen moving stage.

10. The microscope according to claim 6, wherein said connecting member connects said stationary stage and a moving side of said specimen moving stage.

11. An inverted movable objective lens type optical microscope comprising:

a frame;

an observation optical portion having an objective lens, said observation optical portion being movably provided on said frame;

a stage portion having a specimen moving stage, and a stationary stage adapted to receive a manipulator for manipulating a specimen provided on said specimen moving stage, said stage portion being fixedly provided on said frame;

a moving mechanism, provided on said frame, for moving said observation optical portion and said stage portion relative to each other; and a vibration synchronizing mechanism for synchronizing a vibration system of said stationary stage and a vibration system of said specimen moving stages;

wherein said frame comprises a Y-shaped body and an arm member connected to said Y-shaped body; and wherein said Y-shaped body comprises first, second and third members arranged and interconnected to form a substantially Y-shaped configuration, said first and second members being dimensioned to reach a summit of said arm member, and said third member being located immediately below an optical axis of said observation optical portion.

12. The microscope according to claim 11, wherein said moving mechanism includes at least one focusing knob provided on a lower portion of said frame.

13. The microscope according to claim 11, wherein said stationary stage and said specimen moving stage of said stage portion are integrally fixed as one piece to front and rear portions of said frame.

14. The microscope according to claim 11, wherein said vibration synchronizing mechanism includes a connecting member connected to said stationary stage and said specimen moving stage.

15. The microscope according to claim 11, wherein said vibration synchronizing mechanism includes means for coupling said vibration systems of said stationary stage and said specimen moving stage in order to suppress a relative vibration between a vibration system of said frame and at least one of said vibration system of said stationary stage and said vibration system of said specimen moving stage.

16. An inverted movable objective lens type optical microscope comprising:

a frame;

an observation optical portion having an objective lens, said observation optical portion being movably provided on said frame;

a stage portion having a specimen moving stage, and a stationary stage adapted to receive a manipulator for manipulating a specimen provided on said specimen moving stage, said stage portion being fixedly provided on said frame;

a moving mechanism, provided on said frame, for moving said observation optical portion and said stage portion relative to each other; and a vibration synchronizing mechanism for synchronizing a vibration system of said stationary stage and a vibration system of said specimen moving stage;

wherein said frame comprises a pillar portion and a lower member;

wherein said stationary stage comprises a stage plate having a hole therein, a first support member having a first end side fixed to a first end side of said stage plate and a second end side fixed to said pillar portion of said frame, and a second support member having a first end side fixed to a second end side of said stage plate and a second end side fixed to said lower member of said frame; and wherein said specimen moving stage is coupled to said hole in said stage plate.

17. The microscope according to claim 16, wherein said moving mechanism includes at least one focusing knob provided on a lower portion of said frame.

18. The microscope according to claim 16, wherein said stationary stage and said specimen moving stage of said stage portion are integrally fixed as one piece to front and rear portions of said frame.

19. The microscope according to claim 16, wherein said connecting member connects said stationary stage and a fixed side of said specimen moving stage.

20. The microscope according to claim 16, wherein said connecting member connects said stationary stage and a moving side of said specimen moving stage.

* * * * *